US 8,457,248 B2

(12) United States Patent
Kwon et al.

(10) Patent No.: US 8,457,248 B2
(45) Date of Patent: Jun. 4, 2013

(54) APPARATUS AND METHOD FOR MAPPING SYMBOLS TO RESOURCES IN A MOBILE COMMUNICATION SYSTEM

(75) Inventors: Hwan-Joon Kwon, Gyeonggi-do (KR); Youn-Hyoung Huh, Gyeonggi-do (KR); Joon-Young Cho, Gyeonggi-do (KR); Ju-Ho Lee, Gyeonggi-do (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/361,330

(22) Filed: Jan. 30, 2012

(65) Prior Publication Data
US 2012/0128095 A1 May 24, 2012

Related U.S. Application Data

(63) Continuation of application No. 12/129,194, filed on May 29, 2008, now Pat. No. 8,121,218.

(30) Foreign Application Priority Data

May 29, 2007 (KR) .................. 10-2007-0052281
May 29, 2007 (KR) .................. 10-2007-0052333
Aug. 10, 2007 (KR) .................. 10-2007-0080648
Sep. 12, 2007 (KR) .................. 10-2007-0092755
Oct. 9, 2007 (KR) .................. 10-2007-0101491

(51) Int. Cl.
*H04L 27/00* (2006.01)
*H04B 1/00* (2006.01)
(52) U.S. Cl.
USPC ........................................ 375/295; 375/130

(58) Field of Classification Search
USPC .. 375/295, 299, 260, 130, 347, 349; 370/252, 370/329, 330
See application file for complete search history.

(56) References Cited

U.S. PATENT DOCUMENTS
2005/0041588 A1   2/2005   Kim et al.
(Continued)

FOREIGN PATENT DOCUMENTS
JP   2006-287462   10/2006
JP   2006-311465   11/2006
(Continued)

OTHER PUBLICATIONS

Ericsson et al.: "Way Forward on Downlink L1/L2 Control Signaling", R1-063580, TSG-RAN WG1 #47, Nov. 6, 2006.

*Primary Examiner* — Khai Tran
(74) *Attorney, Agent, or Firm* — The Farrell Law Firm, P.C.

(57) ABSTRACT

A method for transmitting data information and control information by a transmitter in a communication system is provided. The method includes identifying an amount of resources to be used for control channel transmission within a predetermined maximum amount of resources available for control channel transmission among total resources of a subframe; mapping control information onto the identified amount of resources to be used for the control channel transmission; mapping data information onto all remaining resources of the subframe, other than the identified resources used for the control channel transmission among the total resources; and transmitting information related to the amount of resources to be used for the control channel transmission, through a predetermined control channel; and transmitting the mapped control information, and the mapped data information.

16 Claims, 17 Drawing Sheets

U.S. PATENT DOCUMENTS

| | | |
|---|---|---|
| 2005/0097424 A1 | 5/2005 | Golitschek et al. |
| 2005/0231757 A1 | 10/2005 | Matsuda |
| 2007/0165588 A1* | 7/2007 | McCoy .................. 370/344 |
| 2008/0285668 A1 | 11/2008 | Lee et al. |
| 2009/0238123 A1 | 9/2009 | Kuri et al. |
| 2009/0316647 A1* | 12/2009 | Chen et al. .................. 370/330 |
| 2010/0188984 A1 | 7/2010 | Futagi et al. |
| 2010/0214990 A1 | 8/2010 | Fukui |
| 2010/0303174 A1 | 12/2010 | Oh et al. |
| 2011/0002235 A1 | 1/2011 | Abeta et al. |
| 2012/0300660 A1 | 11/2012 | Nishio et al. |

FOREIGN PATENT DOCUMENTS

| | | |
|---|---|---|
| JP | 2007-053438 | 3/2007 |
| JP | 2009-512390 | 3/2009 |
| KR | 1020050009659 | 1/2005 |
| KR | 1020060082129 | 7/2006 |
| WO | WO 2007/037412 | 4/2007 |
| WO | WO 2007/052766 | 5/2007 |
| WO | WO 2007/052921 | 5/2007 |
| WO | WO 2007/055292 | 5/2007 |
| WO | WO 2008/114541 | 9/2008 |

* cited by examiner

APPARATUS AND METHOD FOR MAPPING SYMBOLS TO RESOURCES IN A MOBILE COMMUNICATION SYSTEM

PRIORITY

This is a continuation application of U.S. patent application Ser. No. 12/129,194, which claims priority under 35 U.S.C. §119(a) to a Korean Patent Application filed in the Korean Intellectual Property Office on May 29, 2007 and assigned Serial No. 2007-52333, a Korean Patent Application filed in the Korean Intellectual Property Office on May 29, 2007 and assigned Serial No. 2007-52281, a Korean Patent Application filed in the Korean Intellectual Property Office on Aug. 10, 2007 and assigned Serial No. 2007-80648, a Korean Patent Application filed in the Korean Intellectual Property Office on Sep. 12, 2007 and assigned Serial No. 2007-92755, and a Korean Patent Application filed in the Korean Intellectual Property Office on Oct. 9, 2007 and assigned Serial No. 2007-101491, the disclosures of all of which are incorporated herein by reference.

BACKGROUND OF THE INVENTION

1. Field of the Invention

The present invention relates generally to a mobile communication system using Hybrid Automatic Repeat reQuest (HARQ), and in particular, to an apparatus and method for mapping modulation symbols of an HARQ subpacket to resources.

2. Description of the Related Art

Recently, in mobile communication systems, intensive research is being conducted on Orthogonal Frequency Division Multiplexing (OFDM), which is suitable for high-speed data transmission in wire/wireless channels. OFDM, a scheme for transmitting data using multiple carriers, is a kind of Multi-Carrier Modulation (MCM) that converts a serial input symbol stream into parallel symbol streams and modulates each of them with multiple orthogonal subcarriers, or multiple orthogonal subcarrier channels, before transmission. A system that utilizes OFDM as its basic transmission scheme and distinguishes several users through the multiple subcarriers, in other words, a system that supports several users by allocating different subcarriers to different users, is commonly called Orthogonal Frequency Division Multiple Access (OFDMA) system.

HARQ is an important technology used for increasing reliability of data transmission and data throughput in packet-based mobile communication systems. HARQ refers to a combined technology of Automatic Repeat reQuest (ARQ) and Forward Error Correction (FEC).

ARQ is a technology widely used in wire/wireless data communication systems. In this technology, a data transmitter assigns sequence numbers to transmission data packets according to a predetermined rule before transmission, and a data receiver sends, to the transmitter, a retransmission request for a packet corresponding to a missing sequence number, if any, among the received packets with sequence numbers, thereby achieving reliable data transmission.

FEC is a technology for adding redundant bits to transmission data according to a predetermined rule like convolutional coding or turbo coding, before transmission, making it possible to overcome the error generated in the noise or fading environment happening in the data transmission/reception process and thus, to demodulate the originally transmitted data.

In the system using the combined HARQ of the two technologies ARQ and FEC, a data receiver performs a Cyclic Redundancy Check (CRC) check on the decoded data by performing a predetermined inverse FEC process on the received data, to determine if there is any error in the decoded data. If there is no error, the receiver feeds an Acknowledgement (ACK) back to the transmitter so that the transmitter transmits the next data packet. However, if there is an error in the data, the receiver feeds a Non-Acknowledgement (NACK) back to the transmitter so that the transmitter retransmits the previously transmitted packet. The receiver combines the retransmitted packet with the previously transmitted packet, thereby obtaining energy gain. As a result, HARQ obtains highly improved performance, as compared with the conventional ARQ that uses no combining process.

FIG. 1 is a diagram illustrating HARQ. In FIG. 1, the horizontal axis represents a time domain, and 'data channel' represents a channel over which a data packet is transmitted.

Referring to FIG. 1, as packet data undergoes initial transmission 101, a receiver, upon receiving the data, attempts demodulation on the initial transmission packet 101, and determines if there is a reception error on the data channel 101 in a demodulation process. If it is determined that the demodulation on the transmission data has not been successfully achieved, the receiver feeds a NACK 102 back to a data transmitter. The presence of an error can be determined through CRC check. Upon receipt of the NACK 102, the data transmitter performs packet data retransmission 103 for the initial transmission 101. Herein, even when the same information is transmitted, its redundancies can be different coded symbols.

Data transmissions 101, 103, and 105 for transmitting the same data packet are called herein "subpacket". Upon receiving the first data retransmission 103, the data receiver performs combining on the first data retransmission 103 with the received initial transmission data 101 according to a predetermined rule, and attempts demodulation of a data channel through the combining result. If it is determined through CRC check on the data channel that the demodulation on the data transmission has failed, the receiver feeds a NACK 104 back to the data transmitter again.

Upon receipt of the NACK 104, the data transmitter performs second packet data retransmission 105, after a predetermined time has elapsed from the time of the first retransmission 103. That is, data channels for the initial packet transmission 101, the first packet retransmission 103, and the second packet retransmission 105 all transmit the same information.

Upon receiving data through the second retransmission 105, the receiver performs combining on the initial transmission 101, the first retransmission 103, and the second retransmission 105 according to a predetermined rule, and performs demodulation of the data channel. If it is determined through CRC check on the data channel that the demodulation on the data transmission is successful, the data receiver feeds an ACK 106 back to the data transmitter.

Upon receipt of the ACK 106, the data transmitter transmits the next data information, i.e., an initial transmission subpacket 107 for the second data packet, together with a control channel.

The "subpacket generation" (or subpacket construction) indicates a process of encoding a given data packet according to a predetermined procedure and then selecting some or all of the coded symbols to generate each subpacket. Although there are various possible subpacket generation methods, a subpacket generation method based on a circular buffer will be described herein, by way of example.

FIG. 2 is a diagram illustrating exemplary subpacket generation based on a circular buffer. Referring to FIG. 2, one code block 201 indicates one packet data that a transmitter intends to transmit at a given time. The code block 201 is input to a specific turbo encoder 202, which outputs specific coded symbols of S 203, P1 204, and P2 205. The S 203, P1 204, and P2 205 indicate systematic bits, parity bits #1, and parity bits #2, respectively.

The S, P1, and P2 undergo sub-block interleavers 206, 207, and 208, respectively, determining the finally interleaved symbols 209 and 210.

The interleaved symbols 209 and 210 are called a circular buffer, as illustrated in FIG. 2, because during an HARQ operation, generation of symbols for each subpacket is achieved by selecting consecutive symbols in the circular buffer, and when symbols to be sent in a particular subpacket are transferred to the circular buffer, the symbols are selected again at the start point of the circular buffer.

Referring to FIG. 2, reference numeral 211 indicates symbol generation for an initial transmission packet, reference numeral 212 indicates symbol generation for a first retransmission packet, and reference numeral 213 indicates symbol generation for a second retransmission packet.

Although the subpacket generation method illustrated in FIG. 2 may generate adjacent subpackets with inconsecutive symbols 211-213 of FIG. 2, by way of example, the subpacket generation method can also generate the adjacent subpackets with consecutive symbols.

FIG. 3 is a diagram illustrating a detailed example where resources are allocated for pilot, control information and data transmission in one subframe, which is used as a basic unit for a definition of a Transmission Time Interval (TTI) for data transmission in a downlink of a common OFDMA system.

In FIG. 3, the horizontal axis represents a frequency domain, and the vertical axis represents a time domain. The smallest square represents one subcarrier corresponding to one OFDM symbol, and the square is also called a "Resource element (RE)" for convenience. Although it is assumed in FIG. 3 that there are only 36 subcarriers in the frequency domain, by way of example, more subcarriers may exist in the actual system.

The lattices denoted by T1 represent REs where pilot symbols (or reference signals) for a transmit antenna #1 are transmitted. The lattices denoted by T2 represent REs where pilot symbols for a transmit antenna #2 are transmitted. The lattices denoted by T3 represent REs where pilot symbols for a transmit antenna #3 are transmitted. The lattices denoted by T4 represent REs where pilot symbols for a transmit antenna #4 are transmitted.

Resource blocks 302 are each a unit for resource allocation, and one resource block includes 12 subcarriers in the frequency domain and 14 OFDM symbols 301 in the time domain.

Because FIG. 3 includes a total of 36 subcarriers, there are three resource blocks. In FIG. 3, the lattices included in N OFDM symbols 303 represent REs used for transmitting control information. For convenience, these lattices will be referred to herein as a "control channel region".

In the OFDMA system, the common control information includes downlink resource allocation information, uplink resource allocation information, and uplink power control information, and the detailed control information may be slightly different for every system.

FIG. 3 illustrates a mapping diagram in a system that uses Time Division Multiplexing (TDM) in transmitting control information. As illustrated at reference numeral 303 of FIG. 3, control information is transmitted through the foremost N OFDM symbols in the resource blocks. The 'N' value is generally subject to change according to the amount of the control information and the number of REs used for transmission of the control information.

Although the 'N' value is 3 in FIG. 3, this can be changed for every subframe, and information on the 'N' value is transmitted through the control channel region in every subframe. After the generation of the control channel region for transmission of the control information, the three resource blocks illustrated in FIG. 3 are allocated to terminals through predetermined scheduling. For example, resources are allocated in such a manner that among the three resource blocks, a resource block #1 is allocated to a terminal #1, a resource block #2 is allocated to a terminal #2, and a resource block #3 is allocated to a terminal #3. The resource block allocation may be changed for every subframe, and the resource block allocation information, one of the above-stated control information, is transmitted through the control channel region in every subframe.

Actually, it is common that coded symbols undergo a modulation process (QPSK, 16 QAM, etc.) before being loaded on REs. In this case, although an expression "modulated data symbols are mapped to resources" rather than an expression "coded data symbols are mapped to resources" may be correct, an expression "coded symbols are mapped to (or loaded on) resources" will be used herein for convenience. However, it would be obvious to those skilled in the art that the same can be applied in the same way even when modulated data symbols are mapped to resources.

Referring to FIG. 3, numerals indicated by reference numeral 304 indicate 14 OFDM symbols in one subframe. In FIG. 3, the control channel region includes OFDM symbols #1, #2, and #3, and when a resource block #1 is allocated, data symbols are transmitted from an OFDM symbol #4 in the resource block #1.

Among the symbols corresponding to control symbols, the leftmost 12 symbols, e.g., symbols #1-#12, are loaded on 12 subcarriers corresponding to the resource block #1 in each of OFDM symbols #1-#3, and data symbols are loaded on 12 subcarriers corresponding to the resource block #1 in an OFDM symbol #4. In this case, although the loading order (or symbol mapping order) within one OFDM symbol can be defined in various ways, it will be assumed herein that the symbols are loaded on the subcarriers in regular order.

Because 8 subcarriers, not including the subcarriers used for pilot transmission, are available for data transmission in an OFDM symbol #5, the next 8 symbols, i.e., symbols #13-#20, among the symbols corresponding to the sub-block interleaver 206, are loaded on the OFDM symbol #5 in order.

Because 12 subcarriers are available for data transmission in an OFDM symbol #6, the next 12 symbols, i.e., symbols #21-#32, among the symbols corresponding to the sub-block interleaver 206, are loaded on the OFDM symbol #6 in order. Through the same process, the symbols corresponding to the sub-block interleaver 206 are carried on all REs available in the resource block #1 in order.

In the foregoing conventional technology, the method in which a base station maps the coded symbols that it should transmit to a particular user, i.e., into resource blocks allocated to the user, undergoes a significant change in every subframe according to the size of the control channel region, i.e., according to the number, indicated by the 'N' value, of OFDM symbols used for transmission of control channels in a corresponding subframe. Therefore, when an error occurs during reception of information on the control channel region at a terminal, demodulation on the transmitted data packet can be almost impossible.

SUMMARY OF THE INVENTION

Accordingly, the present invention has been designed to address at least the problems and/or disadvantages in the prior art and to provide at least the advantages described below. An aspect of the present invention is to provide a mapping apparatus and method that is robust against an error for a time-varying control channel region when a transmitter maps the coded data symbols to the resource blocks allocated for the data transmission.

In accordance with an aspect of the present invention, a method for transmitting data information and control information by a transmitter in a communication system is provided. The method includes identifying an amount of resources to be used for control channel transmission within a predetermined maximum amount of resources available for control channel transmission among total resources of a subframe; mapping control information onto the identified amount of resources to be used for the control channel transmission; mapping data information onto all remaining resources of the subframe, other than the identified resources used for the control channel transmission among the total resources; and transmitting information related to the amount of resources to be used for the control channel transmission, through a predetermined control channel; and transmitting the mapped control information, and the mapped data information.

In accordance with another aspect of the present invention, an apparatus for transmitting data information and control information in a communication system is provided. The apparatus includes a controller for identifying an amount of resources to be used for control channel transmission within a predetermined maximum amount of resources available for control channel transmission among total resources of a subframe, mapping control information onto the identified amount of resources to be used for the control channel transmission, and mapping data information onto all remaining resources of the subframe, other than the identified resources used for the control channel transmission among the total resources; and a transmitter for transmitting information related to the amount of resources to be used for the control channel transmission, through a predetermined control channel, and transmitting the mapped control information and the mapped data information.

In accordance with another aspect of the present invention, an apparatus for receiving data information and control information in a communication system is provided. The apparatus includes a receiver for receiving information related to an amount of resources to be used for control channel transmission within a predetermined maximum amount of resources available for control channel transmission among total resources of a subframe, and receiving the control information mapped onto an identified amount of resources to be used for the control channel transmission, and the data information mapped onto all remaining resources of the subframe, other than the identified resources used for the control channel transmission among the total resources; and a controller for demapping the control information and the data information, based on the information related to the amount of resources to be used for the control channel transmission.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings.

In the following description, a detailed description of known functions and configurations incorporated herein has been omitted for clarity and conciseness. Terms used herein are defined based on functions in the present invention and may vary according to users, operator intention, or usual practices. Therefore, the definition of the terms should be made based on content throughout the specification.

Although a detailed description of the present invention will be given herein for HARQ data transmission/reception, by way of example, it should be noted that the method proposed by the present invention could also be applied to system where HARQ is not used.

The present invention provides a method for mapping coded/modulated transmission data symbols to resource blocks allocated for the data transmission in a system where some resources included in one or more resource blocks are used for control channel transmission, the remaining resources are used for data transmission, and the amount of resources used for the control channel transmission varies with the passage of time.

In particular, the present invention first maps the coded/modulated data symbols to the resources unavailable for control channel transmission among the resources included in the resource blocks, and then maps the coded/modulated data symbols to the resources actually unused for the control channels in a corresponding subframe in the region available by the control channels.

Figure 4:
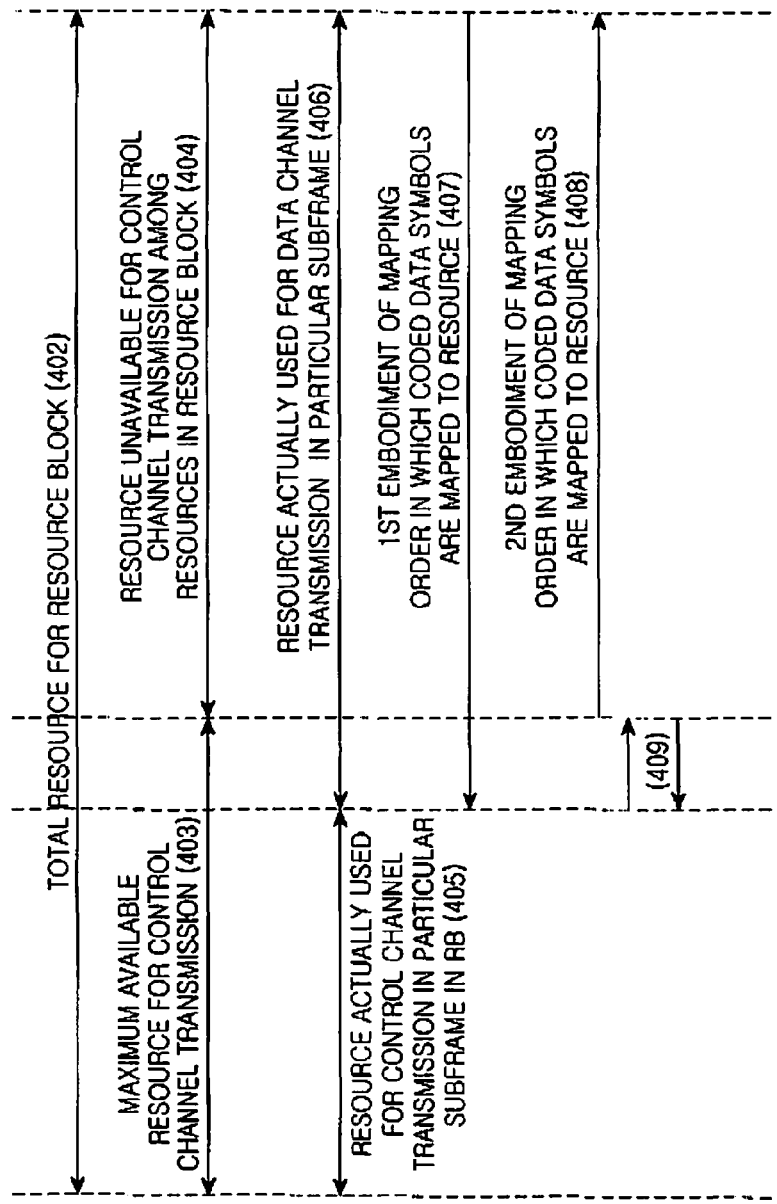
FIG. 4 is a diagram illustrating a resource structure for data symbol mapping according to an embodiment of the present invention.

FIG. 4 is a diagram illustrating a resource structure for data symbol mapping according to an embodiment of the present invention.

As a description of FIG. 4 is given by means of logical resources, the method in which the logical resources can actually be physically mapped to multiple subcarriers in multiple OFDM symbols can be implemented in various ways. Although a description of the present invention will be illustrated in FIG. 4 where one resource block is used for data transmission, by way of example, the same method can also be applied when data is transmitted through several resource blocks.

In FIG. 4, the total resources 402 in one resource block are logically expressed on a one-dimensional basis. Reference numeral 403 denotes the maximum resources available for control channel transmission among the total resources 402 in one resource block. That is, regarding the maximum available resources for control channel transmission, all the resources can be used for control channel transmission, or only some of the resources can be used for control channel transmission. For example, if the number of the total resources 402 is 100, and the number of resources used for control channel transmission is one of 10, 20, and 30, the number of the maximum available resources 403 for transmission of control channels is 30.

Reference numeral 404 represents the resources unavailable for control channel transmission among the total resources 402. In this example, 70 resources may correspond to these resources. Reference numeral 405 represents the resources actually used for control channel transmission among the total resources 402 in a particular subframe. Reference numeral 406 represents the resources actually used for data channel transmission in a particular subframe, which are the remaining resources obtained by subtracting the resources 405 actually used for control channel transmission from the total resources 402 in the subframe.

Coded data symbols are mapped to the above-stated resources in the following two possible embodiments.

A first embodiment starts mapping the coded data symbols from the resources in the opposite side of the resources available by control channels as illustrated by reference numeral 407.

A second embodiment performs mapping on the coded data symbols from the next position of the maximum available resources 403 available for control channels as illustrated by reference numeral 408, and then maps the coded data symbols to the resources actually unused for control channel transmission in the corresponding subframe among the maximum available resources 403 as illustrated by reference numeral 409. As illustrated in FIG. 4, the mapping order for the resources denoted by reference numeral 409 is possible for both directions.

Figure 1:
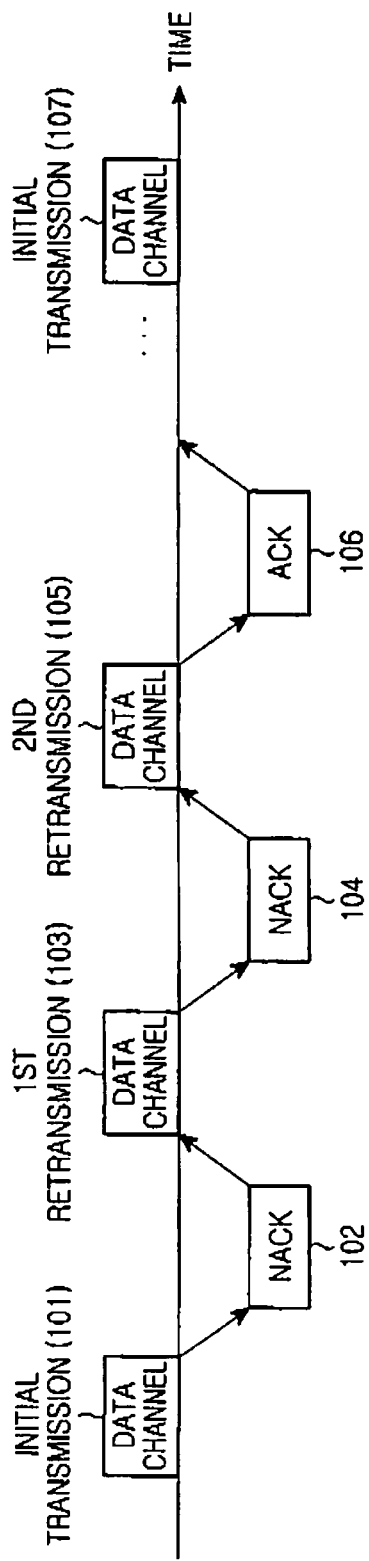
FIG. 1 is a diagram for a description of HARQ.
Figure 2:
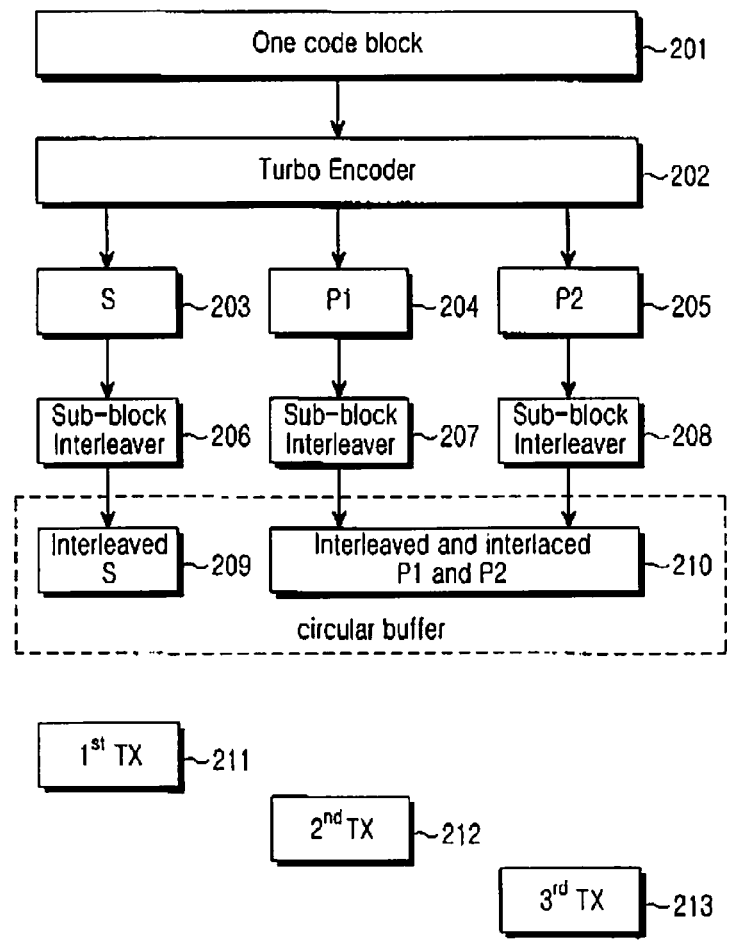
FIG. 2 is a diagram illustrating exemplary subpacket generation based on a circular buffer.

According to the foregoing mapping method of the present invention, the position of resources to which coded symbols of each subpacket illustrated in FIG. 2 are mapped in a resource block can maximally reduce the influence on the change in position of the resources 405 actually used for control channels in the resource block. More specifically, because the coded data symbols undergo mapping beginning from the next to the maximum available resources 403 allocated for control channel transmission, the position and amount of mapping resources for the coded data symbols does not suffer an influence on transmission of control channels that vary for every subframe.

In addition, according to the mapping method proposed by the present invention, even when there is an error for the resources 405 actually used for control channel transmission in a particular subframe in a resource block between a data transmitter and a data receiver, no error may occur in the coded data symbols as the coded data symbols are mapped to the resources, so that the data demodulation can be successfully achieved.

Figure 5:
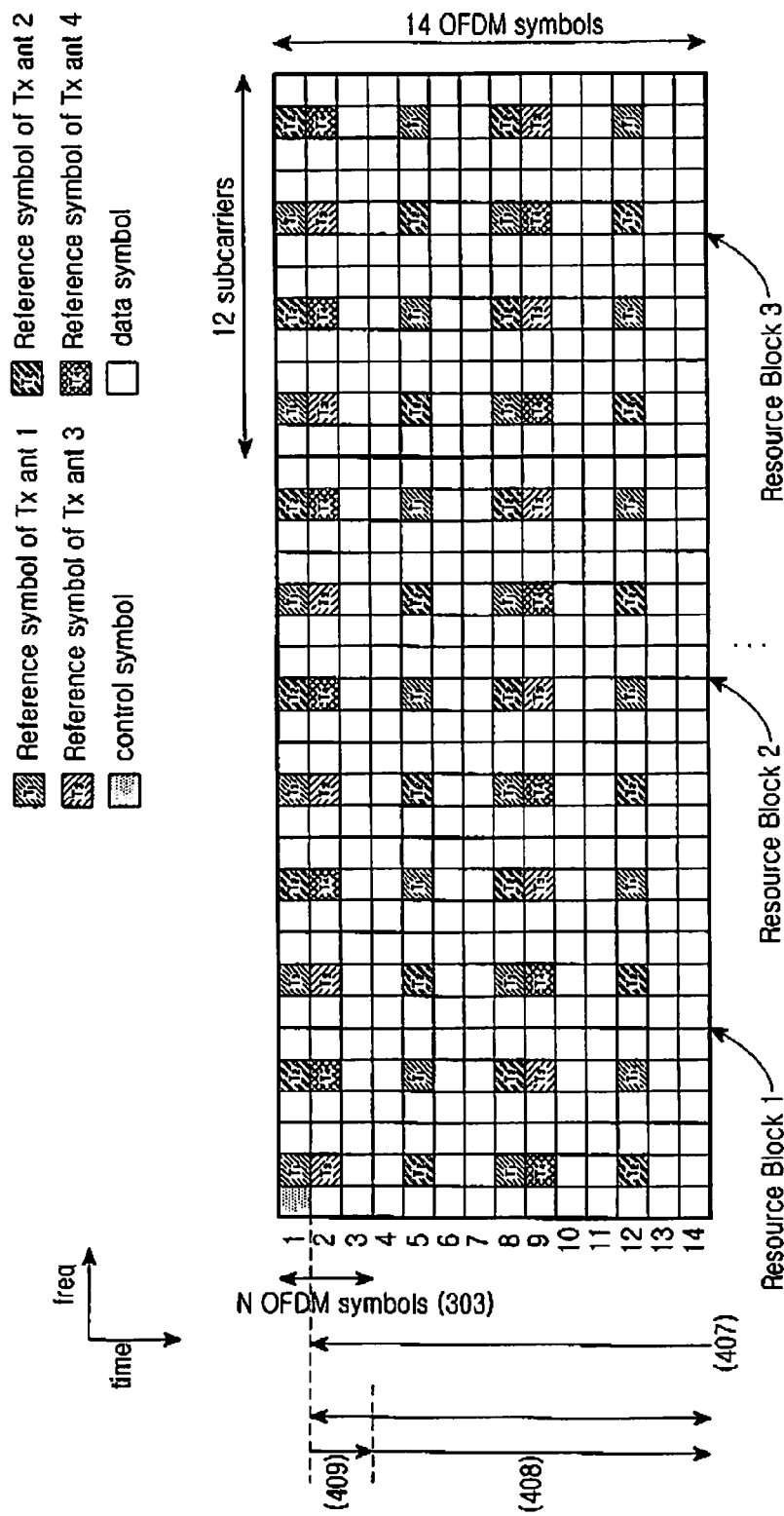
FIG. 5 is a diagram illustrating a detailed mapping method in a downlink according to an embodiment of the present invention.

FIG. 5 is a diagram illustrating a detailed mapping method in a downlink according to an embodiment of the present invention.

Figure 3:
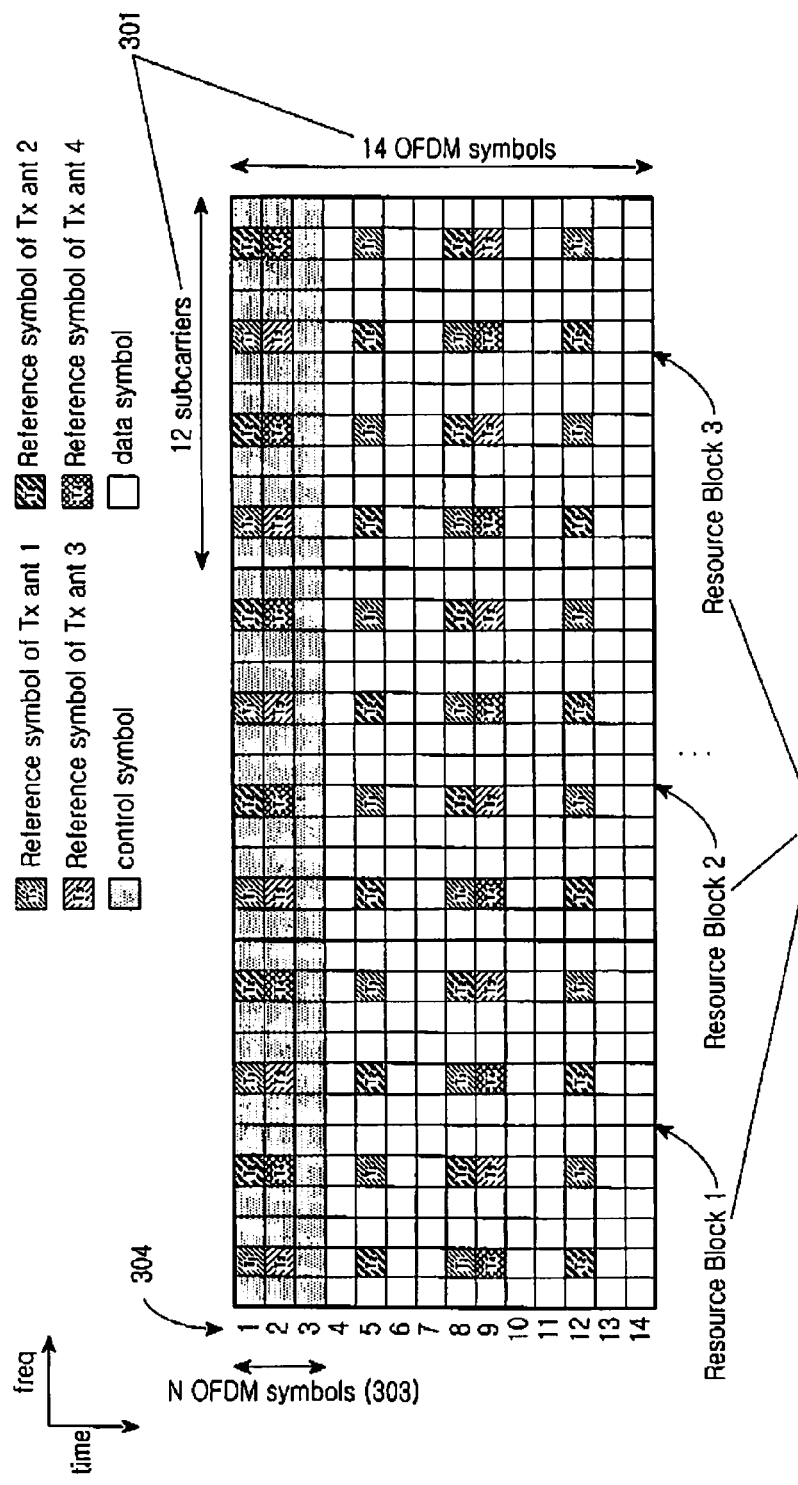
FIG. 3 is a diagram illustrating exemplary resource allocation in a downlink of a conventional OFDMA system.

The maximum value of the number of resources available for control channel transmission, 'N' value of FIG. 3, is 3 in FIG. 5, but the 'N' value is assumed to be 1 in the subframe illustrated in FIG. 5. This means that the first OFDM symbol of the subframe is used for control channel transmission.

The first embodiment is illustrated by reference numeral 407 even in FIG. 5. In the first embodiment, the coded symbols of the subpacket illustrated in FIG. 2 are mapped to resources beginning from an OFDM symbol #14 in the subframe of FIG. 5, undergoing mapping in the order of OFDM symbols #14, #13, #12, . . . , #2.

The second embodiment is illustrated by reference numerals 408 and 409 in FIG. 5. In the second embodiment, the coded symbols of the subpacket illustrated in FIG. 2 are mapped to resources beginning from an OFDM symbol #4 following the OFDM symbols #1, #2, and #3, which are resources to be used for control channels, in the subframe of FIG. 5, and then mapped to the OFDM symbols #2 and #3, which are resources actually unused for control channel transmission in the subframe, among the resources available for the control channels. Regarding the mapping order, the coded symbols may undergo mapping in the order of OFDM symbols #4, #5, #6, . . . , #13, #14, #2, and #3, or in the order of OFDM symbols #4, #5, #6, . . . , #13, #14, #3, and #2.

Figure 6:
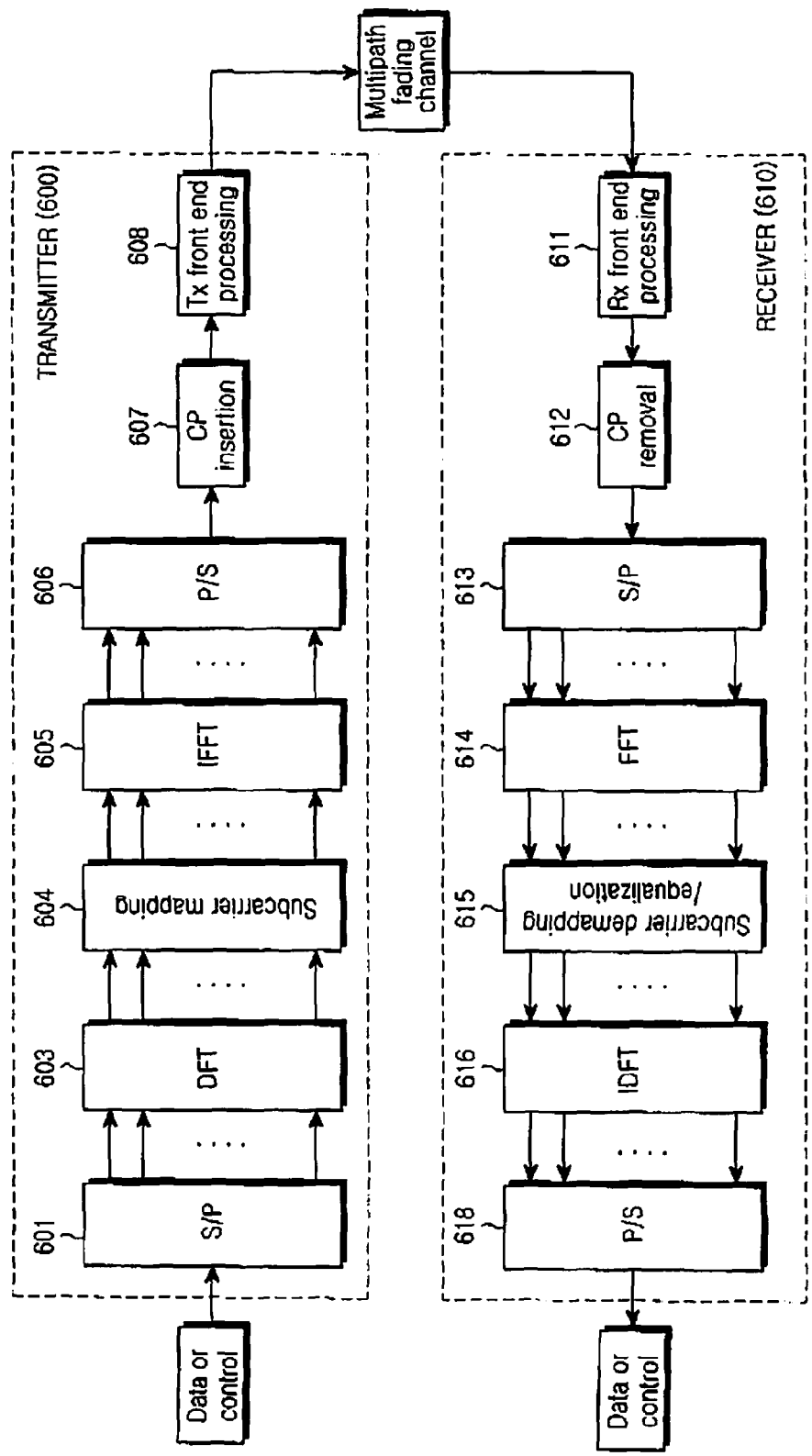
FIG. 6 is a block diagram illustrating a transceiver apparatus in a system that uses Single Carrier Frequency Division Multiple Access (SC-FDMA) as a multiple access scheme in the uplink.

FIG. 6 is a block diagram illustrating a transceiver apparatus in a system that uses Single Carrier Frequency Division Multiple Access (SC-FDMA) as a multiple access scheme in the uplink. SC-FDMA is a multiple access scheme, which is advantageous in minimizing Peak-to-Average Power Ratio (PAPR). Although a description of the transceiver apparatus will be given herein with reference to the system that uses SC-FDMA as a multiple access scheme in the uplink, by way of example, it would be obvious to those skilled in the art that the data symbol mapping method proposed by the present invention can be applied even to the transceiver apparatus in the similar system.

Referring to FIG. 6, user data or control information is converted into multiple parallel signals by a Serial to Parallel converter (S/P) 601, and then input to a Discrete Fourier Transformer (DFT) 603. A subcarrier mapper 604, receiving the signals output from the DFT 603, performs subcarrier mapping thereto. The signals output from the subcarrier mapper 604 are input to an Inverse Fast Fourier Transformer (IFFT) 605, and the IFFT outputs undergo Cyclic Prefix (CP) insertion by a CP inserter 607 after passing through a Parallel to Serial converter (P/S) 606, and then are wirelessly transmitted by a transmission processor 608.

When a reception processor 611 of a receiver 610 receives the wirelessly transmitted signal, a CP remover 612 removes the inserted CP from the received signal, and an S/P 613 converts the CP-removed signal into parallel signals. The parallel signals are input to a subcarrier demapping/equalization unit 615 via a Fast Fourier Transformer (FFT) 614, outputting signals demapped according to the subcarrier mapping information. The demapped signals undergo Inverse Discrete Fourier Transform (IDFT) in an IDFT 616. The signals output from the IDFT 616 are output to a P/S 618. As described above, the receiver 610 performs the inverse signal processing of the transmitter 600 to acquire the data and control information transmitted by the transmitter 600.

The proposed mapping order in which the coded data symbols are mapped to the resources is determined in the resource mapping process at the input of the DFT 603.

Figure 7:
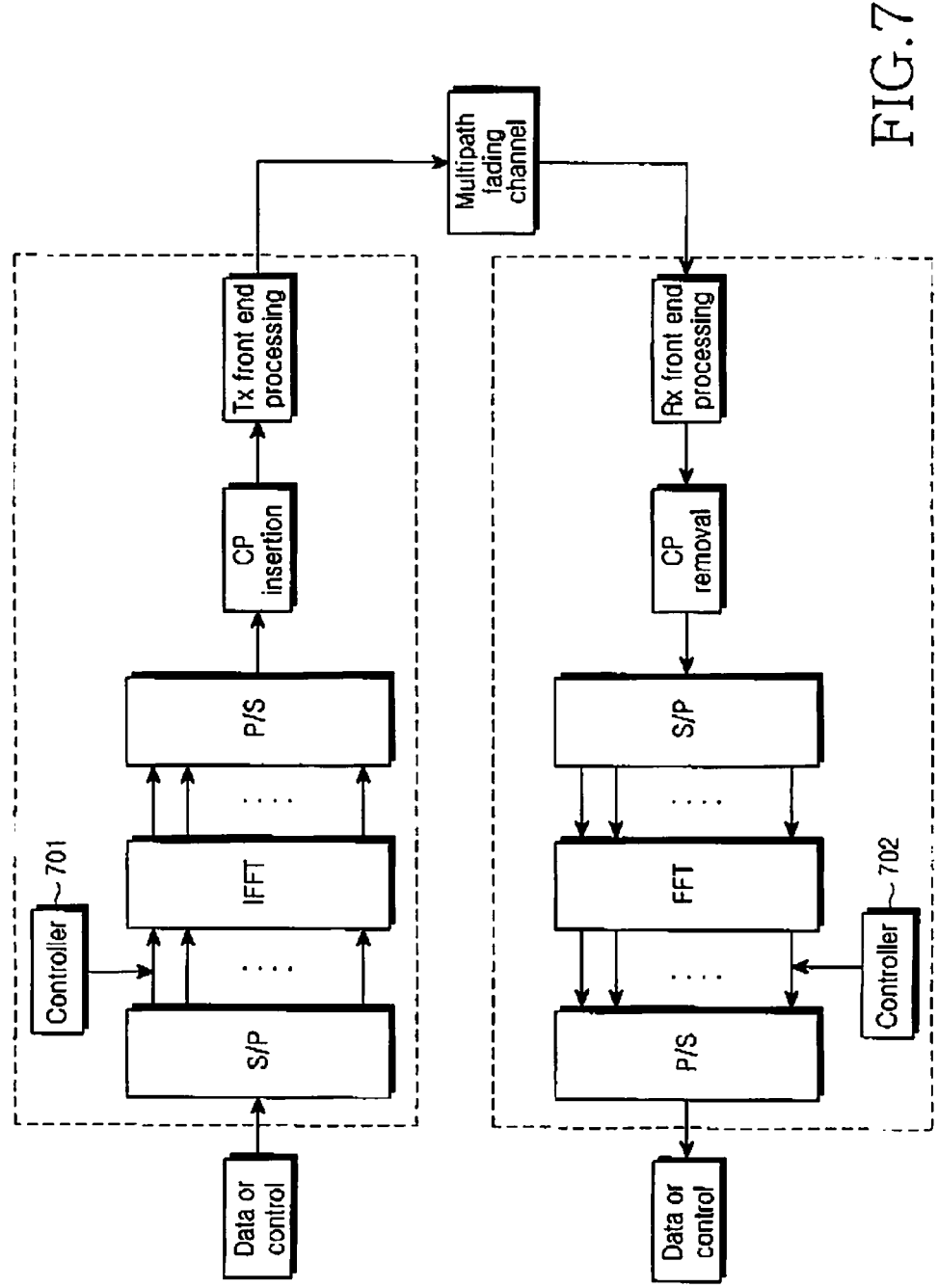
FIG. 7 is a block diagram illustrating a transceiver for the mapping method proposed by the present invention applied to the uplink.

FIG. 7 is a block diagram illustrating a transceiver for the mapping method proposed by the present invention, applied to the uplink. More specifically, FIG. 7 illustrates a block diagram for a common transceiver based on SC-FDMA, and controllers 701 and 702 control the resource mapping and demapping to be performed as stated above.

Figure 8:
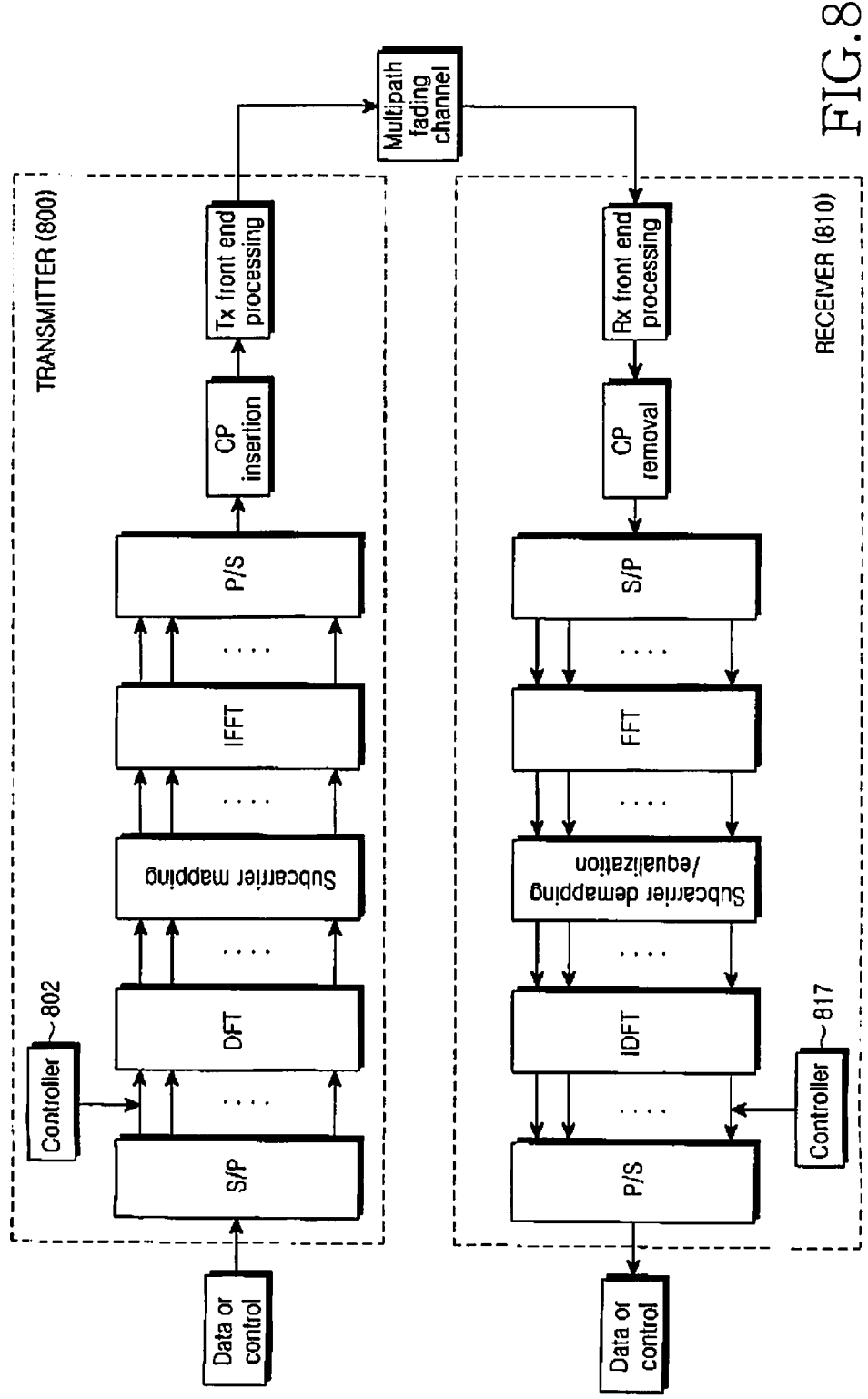
FIG. 8 is a block diagram illustrating another transceiver apparatus for performing a resource mapping method according to an embodiment of the present invention.

FIG. 8 is a block diagram illustrating another transceiver apparatus for performing a resource mapping method according to an embodiment of the present invention. Referring to FIG. 8, a general transceiver based on OFDM, and controllers 802 and 817 control the resource mapping and demapping to be achieved as described above. The remaining elements illustrated in FIG. 8 have been described in detail in FIG. 6.

The detailed embodiments of the resource mapping method performed in the foregoing apparatuses will now be described with reference to FIGS. 9A to 11B. More specifically, FIGS. 9A to 11B illustrate the detailed embodiments of the resource mapping process in the SC-FDMA based uplink.

Figure 9A:
FIG. 9A is a diagram illustrating a direction of the mapping order in which symbols for control channel transmission and coded data symbols are mapped to resources according to a first embodiment of the present invention.
Figure 9B:
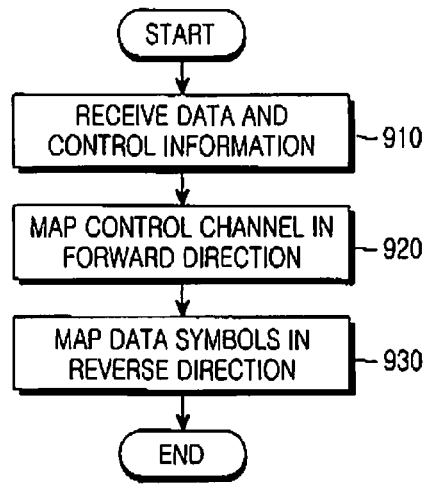
FIG. 9B is a flowchart illustrating a mapping method performed by a controller according to the first embodiment of the present invention.

FIG. 9A is a diagram illustrating a direction of the mapping order in which symbols for control channel transmission and coded data symbols are mapped to resources according to the first embodiment of the present invention. FIG. 9B is a flowchart illustrating a mapping method performed by a controller according to the first embodiment of the present invention.

Referring to FIG. 9B, as a controller receives data and control information in step 910, the controller maps a control channel 901 in the forward direction in step 920 as illustrated in FIG. 9A. The term "forward direction" as used herein refers to the left-to-right mapping direction, and the term "reverse direction" refers to the right-to-left mapping direction.

Thereafter, in step 930, the controller maps data 902 in the reverse direction. That is, as illustrated in FIG. 9A, the control channel 901 and the coded data symbols 902 are mapped in the opposite directions.

Figure 10A:
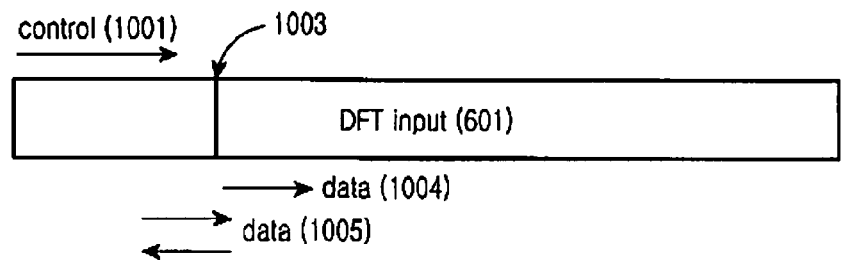
FIG. 10A is a diagram illustrating a direction of the mapping order in which symbols for control channel transmission and coded data symbols are mapped to resources according to a second embodiment of the present invention.
Figure 10B:
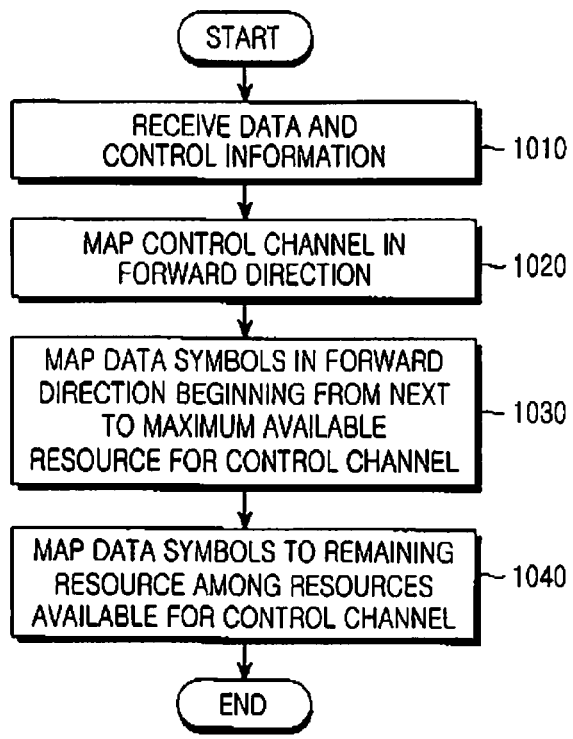
FIG. 10B is a flowchart illustrating a mapping method performed by a controller according to the second embodiment of the present invention.

FIG. 10A is a diagram illustrating a direction of the mapping order in which symbols for control channel transmission and coded data symbols are mapped to resources according to the second embodiment of the present invention. FIG. 10B is a flowchart illustrating a mapping method performed by a controller according to the second embodiment of the present invention.

Referring to FIG. 10B, as a controller receives data and control information in step 1010, the controller maps a control channel 1001 in the forward direction in step 1020, as illustrated in FIG. 10A. In step 1030, the controller maps data 1002 in the forward direction beginning from the next to the maximum available resources for control channels. Thereafter, in step 1040, the controller maps data symbols 1005 to the remaining resources among the resources available for control channels.

Figure 11A:
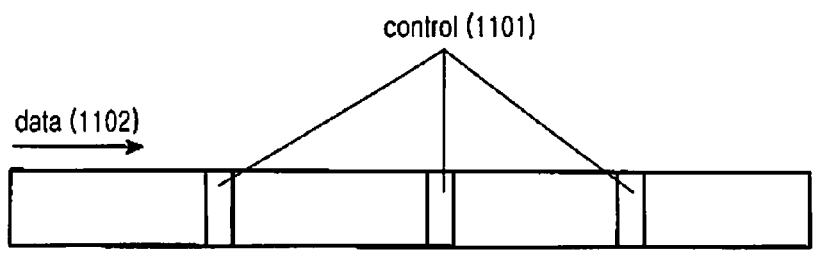
FIG. 11A is a diagram illustrating a direction of the mapping order in which symbols for control channel transmission and coded data symbols are mapped to resources according to a third embodiment of the present invention.
Figure 11B:
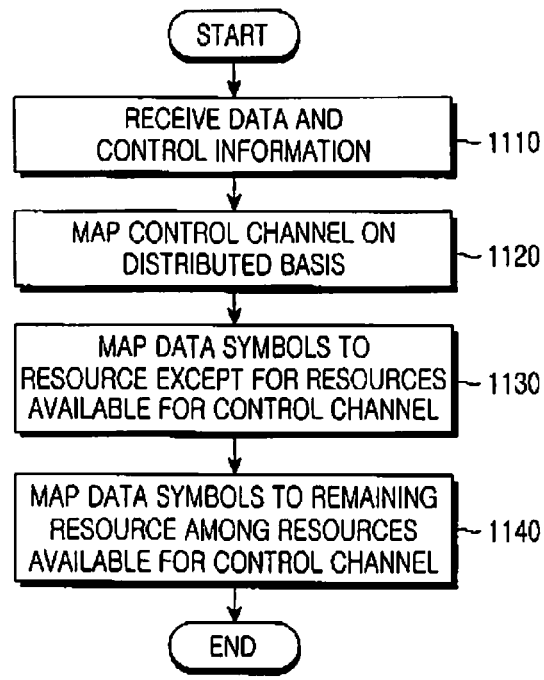
FIG. 11B is a flowchart illustrating a mapping method performed by a controller according to the third embodiment of the present invention.

FIG. 11A is a diagram illustrating a direction of the mapping order in which symbols for control channel transmission and coded data symbols are mapped to resources according to a third embodiment of the present invention. FIG. 11B is a flowchart illustrating a mapping method performed by a controller according to the third embodiment of the present invention.

Referring to FIG. 11B, as a controller receives data and control information in step 1110, the controller maps a control channel 1101 in step 1120 on a distributed basis, as illustrated in FIG. 11A. In step 1130, the controller maps data symbols for data 1102 to the resources, not including the resources available for the control channel 1101. Thereafter, in step 1140, the controller maps the data symbols to the remaining resources among the resources available for control channels.

Figure 12:
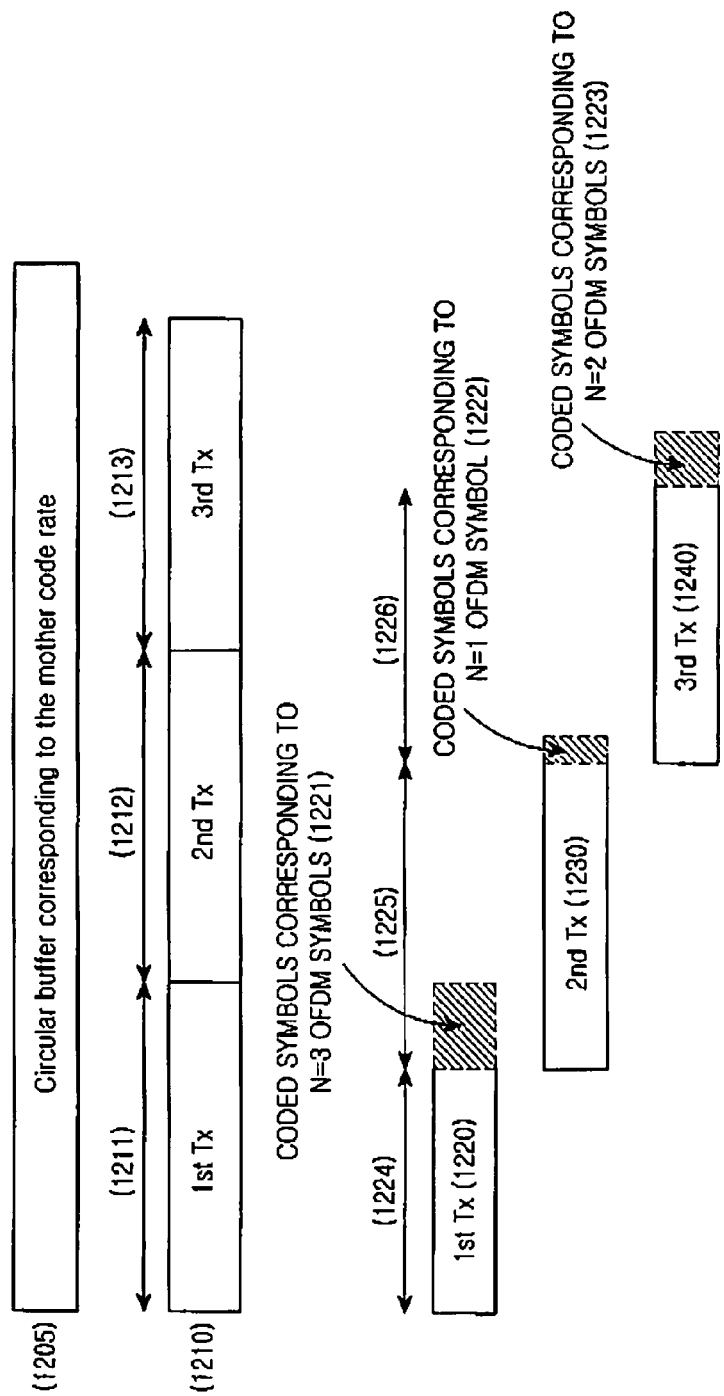
FIG. 12 is a diagram illustrating a method for generating subpackets for HARQ when the amount of resources available for data channel transmission in an allocated resource block varies in a circular buffer, in a mobile communication system.

FIG. 12 is a diagram illustrating a method in a mobile communication system for generating subpackets for HARQ when the amount of resources available for data channel transmission in an allocated resource block varies in a circular buffer. Referring to FIG. 12, reference numeral 1205 indicates a circular buffer, and reference numeral 1210 represents structures of subpackets for the case where all resources in the allocated resource block are available for data transmission. Reference numeral 1211 indicates the leading consecutive coded symbols selectable for generation of the first subpacket in the circular buffer 1205, reference numeral 1212 indicates coded symbols which can be consecutively selected from the next symbol of the first subpacket 1211, for generation of the second subpacket in the circular buffer 1205, and reference numeral 1213 indicates coded symbols which can be consecutively selected from the next symbol of the second subpacket 1212, for generation of the third subpacket 1213 in the circular buffer 1205.

Reference numeral 1220 illustrates the actually-transmitted first subpacket. In the case where all resources in the allocated resource block are available for data transmission, although coded symbols, the number of which corresponds to the first subpacket 1211, could be transmitted, because coded symbols corresponding to 3 OFDM symbols 1221 should be excluded from the first subpacket 1211 as the 3 OFDM symbols 1221 are actually used for control channel transmission in the corresponding subframe, coded symbols, the number of which corresponds to the actually-transmitted first subpacket 1220, can be transmitted. Reference numeral 1224 explicitly indicates a position of the actually-transmitted first subpacket 1220 in the circular buffer 1205.

The second subpacket includes coded symbols from the end point of the first subpacket in the circular buffer 1205.

Reference numeral 1230 indicates the actually-transmitted second subpacket. When all resources in the allocated resource block are available for data transmission, although coded symbols, the number of which corresponds to the second subpacket 1212, could be transmitted, because coded symbols corresponding to 1 OFDM symbol 1222 should be excluded from the second subpacket 1212 as the 1 OFDM symbol 1222 is actually used for control channel transmission in the corresponding subframe, coded symbols, the number of which corresponds to the actually-transmitted second subpacket 1230, can be transmitted. Reference numeral 1225 explicitly indicates a position of the actually-transmitted second subpacket 1230 in the circular buffer 1205.

The third subpacket includes coded symbols from the end point of the second subpacket in the circular buffer 1205.

Reference numeral 1240 indicates the actually-transmitted third subpacket. When all resources in the allocated resource block are available for data transmission, although coded symbols, the number of which corresponds to the third subpacket 1213, could be transmitted, because coded symbols corresponding to 2 OFDM symbols 1223 should be excluded from the third subpacket 1213 as the 2 OFDM symbols 1223 are actually used for control channel transmission in the corresponding subframe, coded symbols, the number of which corresponds to the actually-transmitted third subpacket 1240, can be transmitted. Reference numeral 1226 explicitly indicates a position of the actually-transmitted third subpacket 1240 in the circular buffer 1205.

As illustrated in FIG. 12, when resources available for data transmission are reduced as some resources are used for control channel transmission in the allocated resource block, it is possible to maximize coding performance by generating the next subpacket beginning from the end point of the previous subpacket in the circular buffer. However, the method capable of maximizing coding performance is possible only when it acquires correct information on the varying amount of resources used for control channel transmission every time each subpacket is transmitted. That is, in the example illustrated in FIG. 12, if an error occurs in any information on the amount of resources used for control channel transmission, indicated by reference numerals 1221, 1222, and 1223, a receiver decodes by mapping received symbols to the wrong positions in the circular buffer, and in this case, the decoding cannot be successfully achieved.

Because the amount of resources used for control channel transmission is variable in every subframe as described above, information on the amount of resources is transmitted through a predetermined control channel in every subframe. Therefore, because it is possible that the receiver may not correctly receive information on the amount of resources used for control channel transmission in every subframe, there is a need to generate subpackets so that they are robust against an error for the variation information of the amount of resources.

With reference to the accompanying drawings, a detailed description will now be made of a method for generating subpackets by selecting coded symbols for HARQ based on a circular buffer according to an embodiment of the present invention, and a mobile communication system therefore.

The present invention is directed to determining the fixed amount of resources for data transmission between a transmitter and a receiver, and defining a position of a start symbol, or a start point, of every subpacket in a circular buffer on the basis of the determined fixed amount of resources, in a mobile communication system where some of resources included in one or more resource blocks are used for control channel transmission, the remaining resources are used for data transmission, and the amount of resources used for the control channel transmission varies with the passage of time. A definition of the fixed amount of resources is given separately from a definition of the amount of resources, which are actually available for data transmission at the time the subpacket is actually transmitted.

Although a description of the present invention will be given herein on the assumption that the number of allocated resource blocks is 1, the same can be extended even to the case in which the number of allocated resource blocks is greater than 1.

Figure 13:
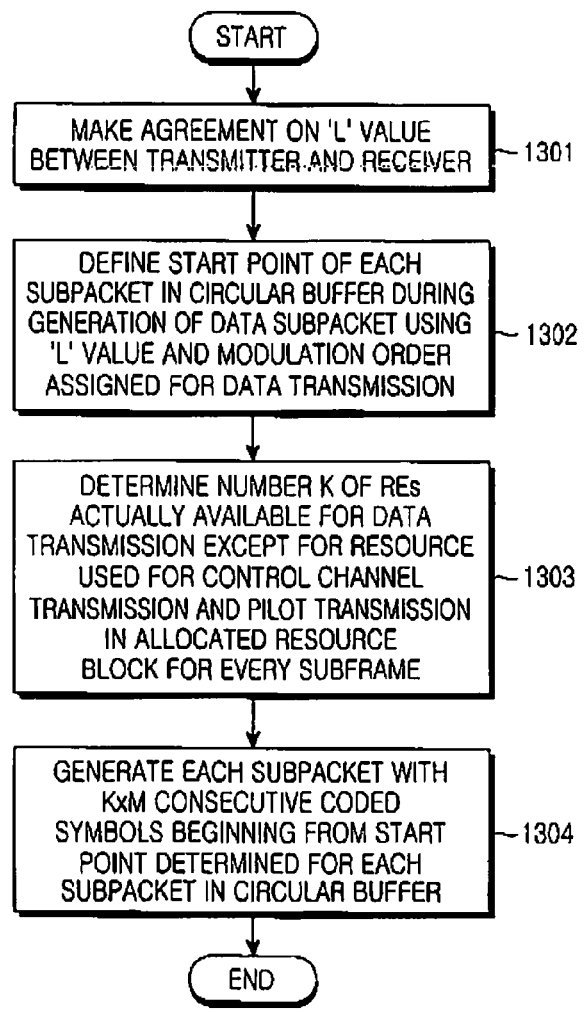
FIG. 13 is a flowchart illustrating a method for generating subpackets in a communication system according to a fourth embodiment of the present invention.

FIG. 13 is a flowchart illustrating a method for generating subpackets in a communication system according to a fourth embodiment of the present invention. Referring to FIG. 13, in step 1301, a transmitter and a receiver determine a reference value, or 'L' value, based on which data subpackets are generated, among the total number T of REs available in the allocated resource block(s) ($L \leq T$). For example, in downlink communication, because the transmitter serves as a base station and the receiver serves as a terminal, all terminals in one base station may have the same 'L' value, or every terminal may have a different 'L' value. When all terminals have the same 'L' value, the 'L' value can be defined such that the terminals always have only the fixed 'L' value, or the 'L' value can be varied through broadcast signaling of system information. However, when every terminal has a different 'L' value, the 'L' value can be determined through predetermined signaling for each terminal. Alternatively, a 'Default L' value is previously defined, and when no signaling for the 'L' value is transmitted from the base station, the terminal can use the 'Default 'L' value.

Although the 'L' value can be directly defined, it can also be defined indirectly by defining the amount of resources for other channels. For example, a reference value for the amount of resources used for control channels can be defined. For example, in the system configuration illustrated in FIG. 3, when the number of REs corresponding to one resource block is 12×14=168, and the leading N=3 REs of the subframe can be used for control channels, the 'L' value can be defined by determining a reference value for the 'N' value as '2'. In this case, for N=2, the 'L' value can be calculated as follows. Because the number of REs corresponding to 2 OFDM symbols in one resource block is 12×2=24, the 'L' value becomes 128 by subtracting 24 from 168 and further subtracting from the result the number of REs used for pilots among the remaining OFDM symbols, 16. Because the number of REs used for pilots is generally invariable, the number of REs used for pilots can be defined such that it is considered in calculation of the 'L' value, or can be defined such that it is disregarded. As the reference value of the resources used for control channels is defined as stated above, it is efficient to use the average amount of resources used for control channels as the reference value when defining the reference value in the scheme of determining the 'L' value.

After the 'L' value is determined as stated above, in step 1302, the transmitter defines a start point indicating a position of the first coded symbol constituting each subpacket in the circular buffer using the 'L' value and a modulation order M assigned for data transmission. It is common that the M is signaled from the transmitter to the receiver, and the 'M' value is 2, 4, and 6 for modulation schemes of 10 QPSK, 16 QAM, and 64 QAM, respectively.

A detailed example of step 1302 will be described.

When the 'L' value is determined as 128, and the 'M' value is 4, a start point of each subpacket in the circular buffer becomes 0, 512 (=128×4), 1024, 2048, etc. It is assumed herein that indexing for coded symbols in the circular buffer starts from 0. When the start point of each subpacket in the circular buffer is defined as stated above, the transmitter generates subpackets for every subframe using consecutive coded symbols from the coded symbol in the start point in step 1303.

In step 1303, the transmitter determines the number K of REs actually available for data transmission, not including the resources used for control channel transmission and pilot transmission in the allocated resource block for every subframe. For example, in the system configuration illustrated in FIG. 3, when one resource block is allocated in a particular subframe, and the 'N' value is 1 in the subframe, the 'K' value becomes (12×13)−(4×5)=136. Although the calculation is made on the assumption that all resources, except for resources used for control channels and pilots, are available for data transmission in the structure of FIG. 3, some REs in the resource block can actually be reserved for a particular purpose, without being used for any purpose. When the 'K' value is determined in this way, the transmitter generates in step 1304 each subpacket with K×M consecutive coded symbols from the start point determined for each subpacket in the circular buffer.

Figure 14:
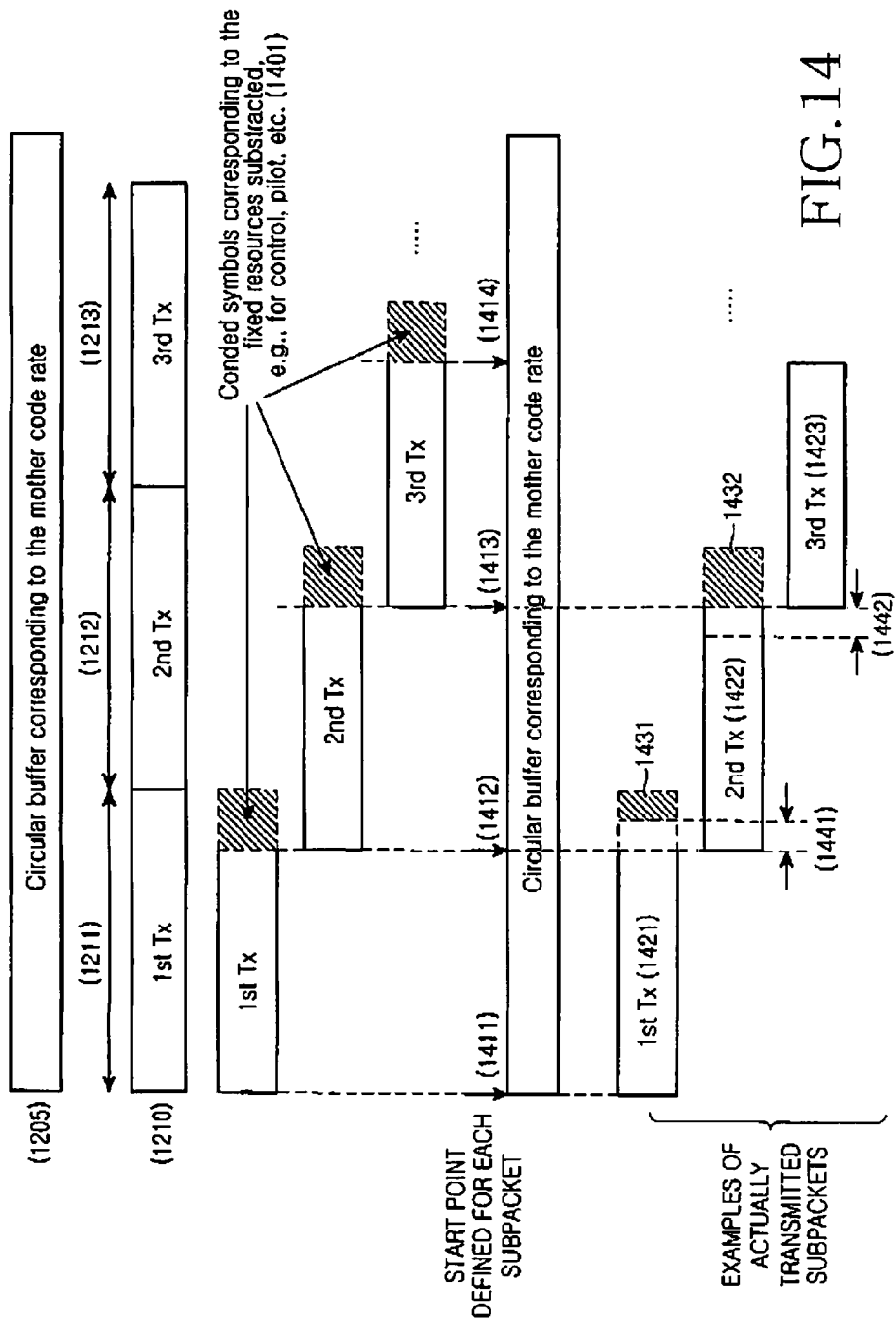
FIG. 14 is a flow diagram illustrating a method for generating subpackets in a mobile communication system according to the fourth embodiment of the present invention.

FIG. 14 is a flow diagram illustrating a method for generating subpackets in a mobile communication system according to a fourth embodiment of the present invention. A circular buffer indicated by reference numeral 1205 in FIG. 14 according to the fourth embodiment of the present invention is the same as described in FIG. 2. The parts indicated by reference numerals 1210 to 1213 are the same as described in FIG. 12. Reference numeral 1401 indicates the amount of coded symbols corresponding to the reference value when the method of using the reference value for the amount of control channel resources is applied to define the 'L' value as described in FIG. 13. When the 'L' value is calculated by the reference value for the amount of control channels as stated above, start points of subpackets in the circular buffer are defined as indicated by reference numerals 1411, 1412, 1413, and 1414 on the basis of the 'L' value and the 'L' value. Reference numerals 1421, 1422, and 1423 indicate examples of subpackets actually generated in each subframe.

Because the amount 1431 of resources allocated for control channel transmission is less than the reference amount 1401 at the time the first subpacket 1421 is transmitted, the end point indicating the last coded symbol constituting the first subpacket 1421 exceeds the start point 1412 of the second subpacket 1422. That is, when the second subpacket 1422 is transmitted, overlapping occurs in the circular buffer as indicated by reference numeral 1441. The coded symbols transmitted after undergoing overlapping in the two subpackets are restored to one coded symbol at the receiver through combining.

Because the amount 1432 of resources allocated for control channel transmission is greater than the reference amount 1401 at the time the second subpacket 1422 is transmitted, the end point of the second subpacket 1422 cannot reach the start point 1413 of the third subpacket 1423. That is, when the third subpacket 1423 is transmitted, a gap occurs between the second subpacket 1422 and the third subpacket 1423 in the circular buffer as shown by reference numeral 1442. The coded symbols corresponding to the gap between the two subpackets are processed as an error, for example, replaced with '0', at the receiver, and restored through a decoding process.

Aside from the foregoing method for determining the start points by setting the 'L' value determined for every subpacket according to the fourth embodiment, it is possible to determine start points depending on the types of the control channels according to a fifth embodiment.

Control channels transmitted over the uplink include a control channel (hereinafter "pre-configured channel"), the correct transmission time of which the transmitter and the receiver can know, such as Channel Quality Indicator (CQI) indicating the channel quality and sounding Reference Signal (RS), and also include a control channel (hereinafter "dynamically-configured channel") such as ACK/NACK, for which a situation may happen in which when a reception error of a downlink control channel occurs, the receiver considers that ACK/NACK has been transmitted from the transmitter, but the transmitter does not transmit ACK/NACK.

Regarding the pre-configured channel, if a transmission time of the control channel or resource information is previously set through upper layer signaling, or if whether to perform control channel transmission is determined through an uplink grant and an error occurs in the grant, the uplink data is not transmitted. Therefore, the reception times of the control channel, expected by the transmitter and the receiver, are correctly coincident with each other.

Therefore, when the control channel is a pre-configured channel, when there is a 'Normal L' value L_normal, the remaining value obtained by subtracting the number of resources used for transmission of the pre-configured channel from the L_normal value is set to the 'L' value, and when the control channel is a dynamically-configured channel, the 'Normal L' value is used without change.

More specifically, assuming that the L_normal value is an 'L' value used for normal transmission, when the pre-configured channel is transmitted, the 'L' value used for determining the start value becomes L_normal-N in the next transmission subframe. Therefore, if the transmitter determines the start points of the subpackets taking L_normal-N into account, the gap occurs in the circular buffer during transmission of the dynamically-configured channel, making it possible to minimize the influence caused by the control channel.

The transmitter can set CQI transmission with the pre-configured channel and the dynamically-configured channel, and when CQI transmission with the pre-configured channel and CQI transmission with the dynamically-configured channel simultaneously occur, the transmitter can perform CQI transmission with the dynamically-configured channel, or perform CQI transmission with the pre-configured channel. If it is assumed that CQI transmission is performed with the pre-configured channel as stated above, it is possible to determine the start value in the next transmission subframe as L_normal-N allocated to all. The start value is determined in the next transmission subframe as L_normal-N allocated to all to avoid discrepancy in the start values of the receiver and the transmitter, because the discrepancy in the start values of the receiver and the transmitter may occur like the dynamically-configured channel error when the transmitter performs CQI transmission with the pre-configured channel rather than performing CQI transmission with the dynamically-configured channel due to an error of Packet Data Control Channel (PDCCH).

More specifically, at the time the CQI transmission is performed with the pre-configured channel, if the transmitter determines the start value of the next subframe as L_normal-N by CQI transmission with the pre-configured channel regardless of whether CQI transmission is performed with the pre-configured channel or CQI transmission is performed with the dynamically-configured channel, it is possible to make the start values of the receiver and the transmitter equal.

Figure 15:
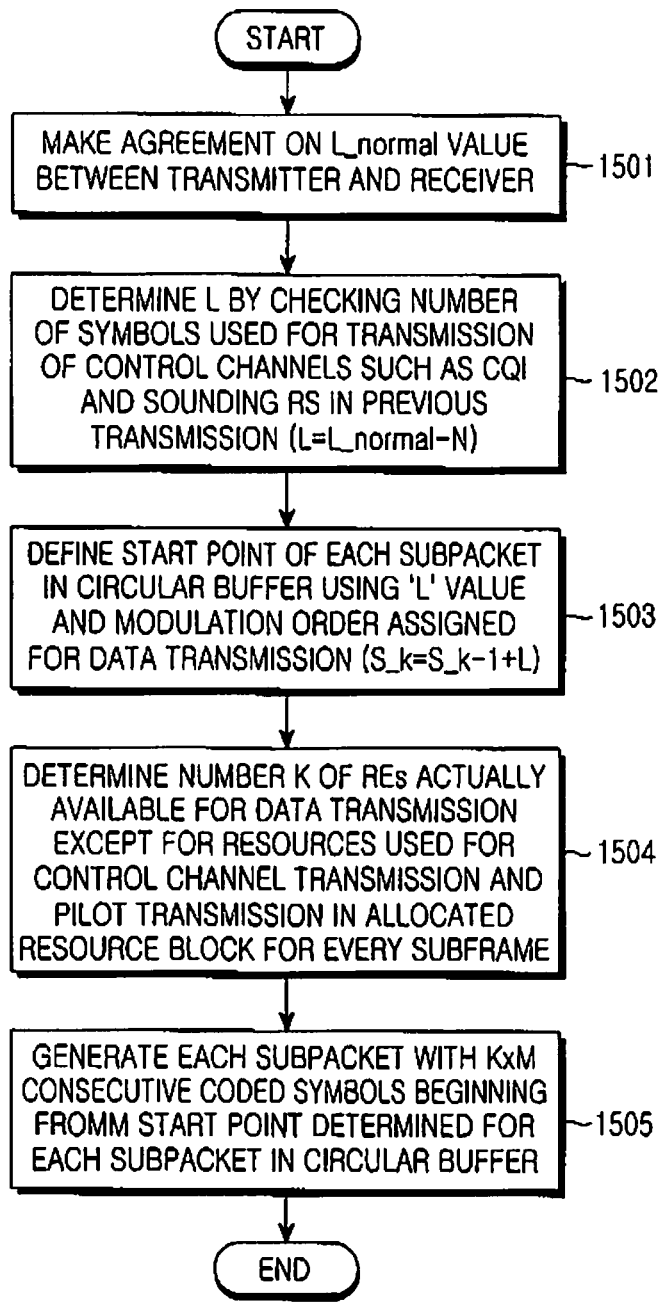
FIG. 15 is a flowchart illustrating a method for generating subpackets in a mobile communication system according to a fifth embodiment of the present invention.

FIG. 15 is a flowchart illustrating a method for generating subpackets in a mobile communication system according to the fifth embodiment of the present invention. Referring to FIG. 15, in step 1501, a transmitter and a receiver determine an L_normal value during generation of data subpackets among the total number T of REs available in the allocated resource block(s). When the L_normal value is determined, the transmitter checks in step 1502 whether control information corresponding to a pre-transmitted channel was transmitted in previous transmission, to determine an 'L' value used for determining the start points. The 'L' value is determined using the L_normal-N, where N denotes the amount of resources used for transmitting the pre-configured channel. When the 'L' value is determined, the transmitter defines in step 1503 a start point indicating the position of the first coded symbol expected to constitute the subpacket in the circular buffer, using the 'L' value and a modulation order assigned for data transmission. Because the 'L' value varies at every transmission of the subpacket, the start point is defined as a start point S_k of the current transmission by adding the 'L' value to a start point S_k−1 of the previous transmission.

In step 1504, the transmitter determines number K of REs actually available for data transmission, not including the resources used for control channel transmission and pilot transmission, in the allocated resource block in every subframe.

When the 'K' value is determined, the transmitter generates in step 1505 each subpacket with K×M consecutive coded symbols from the start point determined for each subpacket in the circular buffer.

Figure 16:
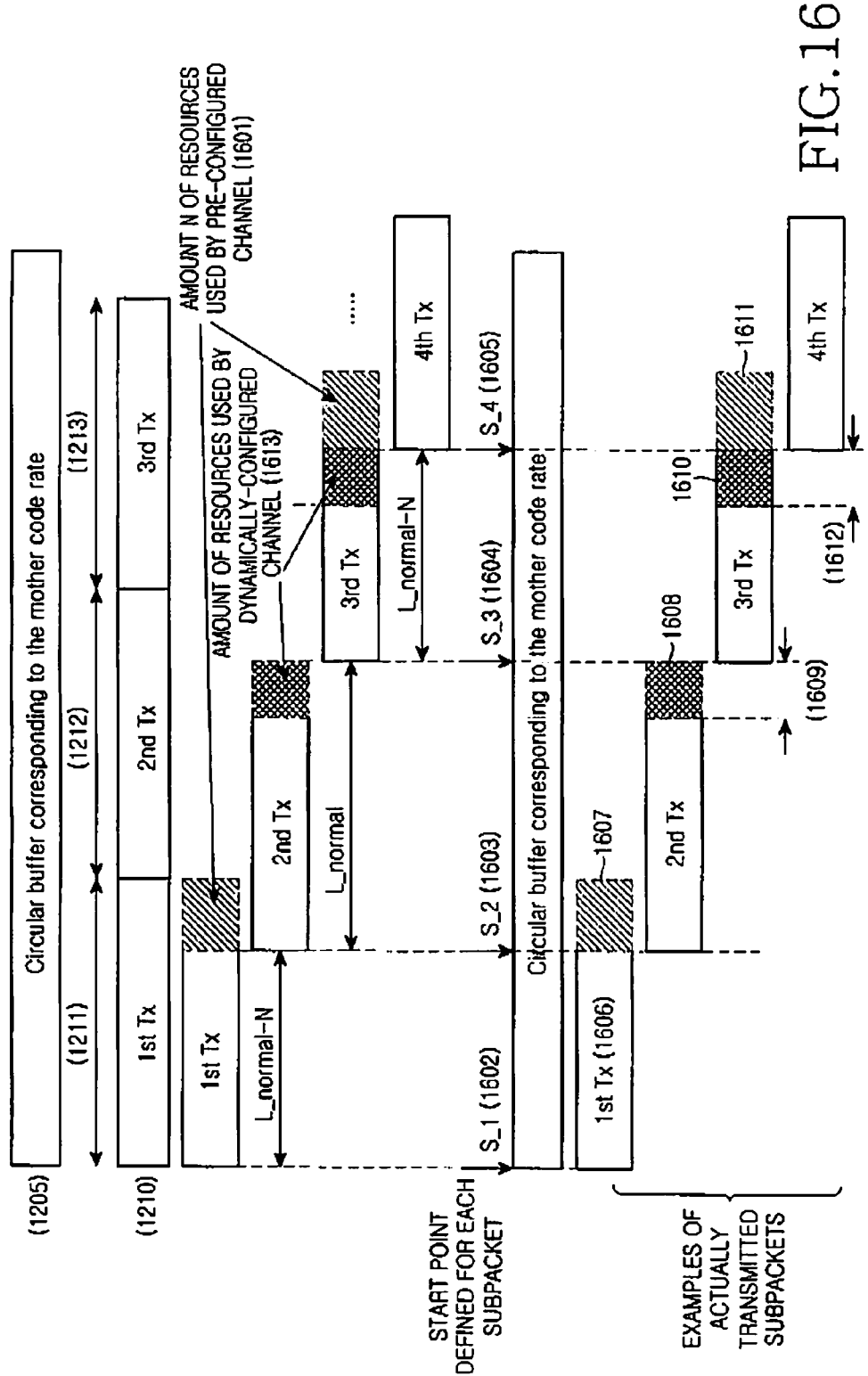
FIG. 16 is a flow diagram illustrating a method for generating subpackets in a mobile communication system according to the fifth embodiment of the present invention.

FIG. 16 is a flow diagram illustrating a method for generating subpackets in a mobile communication system according to the fifth embodiment of the present invention. The circular buffer indicated by reference numeral 1205 in FIG. 16 according to the fifth embodiment of the present invention is the same as described in FIG. 2. The parts indicated by reference numerals 1210 to 1213 are the same as described in FIG. 12. Reference numeral 1601 indicates the amount of coded symbols used for transmitting the pre-configured channel to define the 'L' value as described in FIG. 15. The L_normal value indicates the number of symbols transmittable with the scheduled resources.

During transmission of each subpacket, the transmitter according to the fifth embodiment of the present invention sets the start of the circular buffer as a start point S__1 1602, for the first transmission, and for the second transmission, because pre-configured channel information 1607 is transmitted at previous transmission, the transmitter sets the start point as S__2 1603, after subtracting the corresponding amount there from. For third transmission, because only the dynamically-configured channel control information 1608 is transmitted at previous transmission, the transmitter sets the start point as S__3 1604, taking only the L normal into account. For fourth transmission, because pre-configured channel control information 1611 is transmitted at previous transmission, the transmitter sets the start point as S__4 1605, after subtracting again the pre-configured channel and the dynamically-configured channel from the L normal value.

If the transmitter determines the start points of the subpackets taking the control channels into account according to the fifth embodiment of the present invention as described above, the gap may occur in the circular buffer only during transmission of the dynamically-configured channel, contributing to minimization of the influence caused by the control channels.

Figure 17:
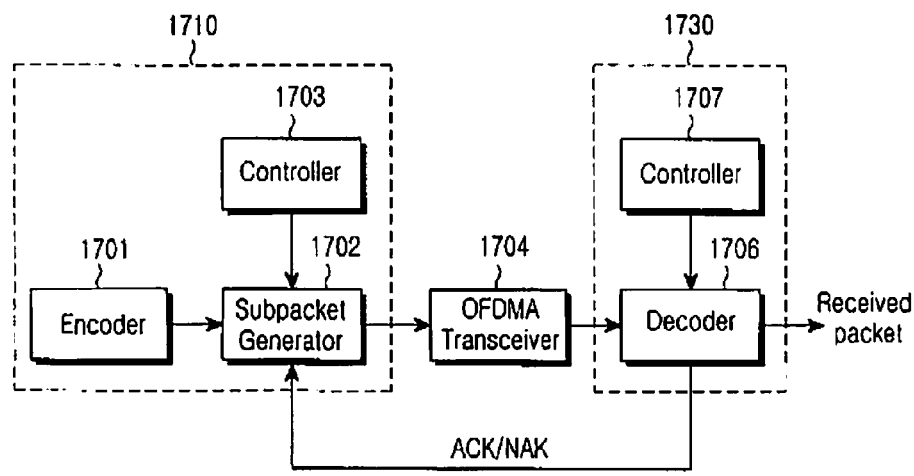
FIG. 17 is a block diagram illustrating a mobile communication system that uses the subpacket generation method according to an embodiment of the present invention.

FIG. 17 is a block diagram illustrating a mobile communication system that uses the subpacket generation method according to an embodiment of the present invention. Referring to FIG. 17, a transmitter 1710 includes an encoder 1701, a subpacket generator 1702, and a controller 1703. A receiver 1730 includes a decoder 1706 and a controller 1707. The encoder 1701 encodes a specific data packet, and outputs coded symbols. The subpacket generator 1702, under the control of the controller 1703, selects some or all of the coded symbols. The controller 1703 controls the subpacket generator 1702 so that subpackets are generated as described in FIGS. 5 and 7.

A transceiver chain 1704 transmits the subpacket output from the subpacket generator 1702 to the receiver 1730 through, for example, an OFDM transmission/reception procedure.

In the receiver 1730, the decoder 1706, under the control of the controller 1707, decodes the received subpacket and feeds ACK/NACK back to the transmitter 1710 according to the decoding result. The controller 1707 controls the decoder 1706 so that a position of each received subpacket in the circular buffer is determined as illustrated in FIGS. 5 and 7.

In the transmitter 1710, based on the received feedback information, the subpacket generator 1702 generates a retransmission data packet of the transmitted data packet, i.e., the next subpacket, or generates an initial transmission subpacket of a new data packet, and transmits the generated subpacket.

In the subpacket generation method proposed by the present invention, overlapping or a gap happens between subpackets in the circular buffer, but its interval is relatively short. In addition, because the start point of each subpacket is previously defined, no error occurs for the start point of each subpacket, making it possible to generate subpackets that are robust against an error in the information on the amount of resources for control channels.

As is apparent from the foregoing description, the present invention provides a mapping apparatus and method that is robust against an error for a time-varying control channel region when a transmitter maps the coded data symbols that it should transmit, to the resource blocks allocated for the data transmission, thereby contributing to an increase in reliability of data transmission/reception.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:
1. A method for transmitting data information and control information by a transmitter in a communication system, the method comprising:
identifying an amount of resources to be used for control channel transmission within a predetermined maximum amount of resources available for control channel transmission among total resources of a subframe;
mapping control information onto the identified amount of resources to be used for the control channel transmission;
mapping data information and a reference signal onto all remaining resources of the subframe, other than the identified resources used for the control channel transmission among the total resources; and
transmitting information related to the amount of resources to be used for the control channel transmission, through a predetermined control channel; and
transmitting the mapped control information, the mapped reference signal, and the mapped data information.

2. The method of claim 1, wherein the amount of resources to be used for the control channel transmission varies in a next subframe.

3. The method of claim 1, wherein the resources are OFDM symbols.

4. The method of claim 3, wherein the predetermined maximum amount of resources available for the control channel transmission among the total resources is 3 OFDM symbols.

5. A method for receiving data information, a reference signal, and control information by a receiver in a communication system, the method comprising:
receiving information related to an amount of resources to be used for control channel transmission within a predetermined maximum amount of resources available for control channel transmission among total resources of a subframe;
receiving the control information mapped onto the identified amount of resources to be used for the control channel transmission, and the reference signal and the data information, which are mapped onto all remaining resources of the subframe, other than the identified resources used for the control channel transmission among the total resources; and
demapping the control information, the reference signal, and the data information, based on the information related to the amount of resources to be used for the control channel transmission.

6. The method of claim 5, wherein the amount of resources to be used for the control channel transmission varies from a previous subframe.

7. The method of claim 5, wherein the resources are OFDM symbols.

8. The method of claim 7, wherein the predetermined maximum amount of resources available for the control channel transmission among the total resources is 3 OFDM symbols.

9. An apparatus for transmitting data information and control information in a communication system, the apparatus comprising:
a controller for identifying an amount of resources to be used for control channel transmission within a predetermined maximum amount of resources available for control channel transmission among total resources of a subframe, mapping control information onto the identified amount of resources to be used for the control channel transmission, and mapping data information and a reference signal onto all remaining resources of the subframe, other than the identified resources used for the control channel transmission among the total resources; and
a transmitter for transmitting information related to the amount of resources to be used for the control channel transmission, through a predetermined control channel, and transmitting the mapped control information, the mapped reference signal, and the mapped data information.

10. The apparatus of claim 9, wherein the amount of resources to be used for the control channel transmission varies in a next subframe.

11. The apparatus of claim 10, wherein the resources are OFDM symbols.

12. The apparatus of claim 11, wherein the predetermined maximum amount of resources available for the control channel transmission among the total resources is 3 OFDM symbols.

13. An apparatus for receiving data information, a reference signal, and control information in a communication system, the apparatus comprising:
a receiver for receiving information related to an amount of resources to be used for control channel transmission within a predetermined maximum amount of resources available for control channel transmission among total resources of a subframe, and receiving the control information mapped onto an identified amount of resources to be used for the control channel transmission, and the reference signal and the data information, which are mapped onto all remaining resources of the subframe, other than the identified resources used for the control channel transmission among the total resources; and
a controller for demapping the control information, the reference signal, and the data information, based on the information related to the amount of resources to be used for the control channel transmission.

14. The apparatus of claim 13, wherein the amount of resources to be used for the control channel transmission varies from a previous subframe.

15. The apparatus of claim 13, wherein the resources are OFDM symbols.

16. The apparatus of claim 14, wherein the predetermined maximum amount of resources available for the control channel transmission among the total resources is 3 OFDM symbols.

* * * * *